United States Patent
McKinney et al.

(10) Patent No.: US 7,796,980 B1
(45) Date of Patent: Sep. 14, 2010

(54) REMOTE MOBILE VOICE CONTROL OF DIGITAL/PERSONAL VIDEO RECORDER

(75) Inventors: David Uel McKinney, Olathe, KS (US); Tim Swan, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 398 days.

(21) Appl. No.: 11/464,002

(22) Filed: Aug. 11, 2006

(51) Int. Cl.
*H04M 3/00* (2006.01)
*H04M 1/00* (2006.01)
*H04M 11/00* (2006.01)
*H04L 12/58* (2006.01)

(52) U.S. Cl. ............ 455/418; 455/412.1; 455/419; 455/556.2; 379/265.01; 379/88.14

(58) Field of Classification Search ............ 455/418, 455/412, 419, 517, 518, 556.2, 3.03, 3.05, 455/340, 381, 67.7, 79.1, 16, 92, 3.01, 3.04, 455/3.06; 379/265, 88.14, 88.13; 704/258, 704/260, 246, 275; 725/80, 98, 100, 39, 725/14, 110, 48

See application file for complete search history.

(56) References Cited

U.S. PATENT DOCUMENTS

| 7,194,069 | B1 * | 3/2007 | Jones et al. | 379/88.02 |
| 2002/0151327 | A1 * | 10/2002 | Levitt | 455/556 |
| 2004/0078807 | A1 * | 4/2004 | Fries et al. | 725/14 |
| 2005/0114711 | A1 * | 5/2005 | Hesselink et al. | 713/201 |
| 2006/0075429 | A1 * | 4/2006 | Istvan et al. | 725/39 |
| 2007/0118857 | A1 * | 5/2007 | Chen et al. | 725/61 |
| 2008/0033725 | A1 * | 2/2008 | Peak et al. | 704/260 |

* cited by examiner

*Primary Examiner*—Lester Kincaid
*Assistant Examiner*—Kuo Woo

(57) ABSTRACT

Systems and methods are provided for controlling a media host device from a mobile voice device. In accordance with a method of the present invention, a call is received from the mobile voice device. A portion of an electronic programming guide is obtained and verbally provided to the mobile voice device in response to the call. A verbal selection associated with the electronic programming guide is received from the mobile voice device and communicated to the media host device through a command encompassing the verbal selection.

20 Claims, 4 Drawing Sheets

REMOTE MOBILE VOICE CONTROL OF DIGITAL/PERSONAL VIDEO RECORDER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Devices, commonly referred to as digital video recorders (DVRs) (or personal video recorders "PVRs" or the like), have been developed that allow users to digitally record and store media content on hard drives or some other media. A user may program a DVR to record content, such as television shows and movies, and watch the content at a later time. Typically, the user can program the DVR using a remote control or through a set of program buttons that is on or communicatively connected to the DVR. It is also possible for the user to program the DVR using a mobile device from a remote location. For example, the user can dial in from the mobile device to receive an electronic programming guide (e.g., TV Guide) and to make one or more selections from the electronic programming guide displayed on the mobile device.

It is, however, very cumbersome to navigate through and view an electronic programming guide through a limited display area of a typical modern day mobile device. It is equally cumbersome to use a set of typically very small keyboard buttons. Therefore, it would be advantageous for users to verbally receive, navigate through, and select from an electronic programming guide to program DVRs. However, providing a voice-activated interface for programming DVRs poses a difficult challenge, because the existing infrastructure that supports remote programming of DVRs is not based on voice-activated interactions. Therefore, providing a voice-activated interface for programming DVRs could advance the current state of the art.

SUMMARY

The present invention is directed to systems and methods for providing a voice-activated interface for a mobile voice device for programming DVRs by verbally receiving, navigating through, and selecting from an electronic programming guide. Thus, in one aspect, an embodiment of the present invention relates to a method for verbally controlling a media host device from a mobile voice device. A call is received from the mobile voice device. A portion of an electronic programming guide is obtained in response to the call. The responsive portion of the electronic programming guide is verbally provided to the mobile voice device. A verbal selection associated with the electronic programming guide is received from the mobile voice device. A command encompassing the verbal selection is then communicated to the media host device.

In another aspect, an exemplary embodiment of the invention takes the form of a system for controlling a media host device from a mobile voice device. The system includes a voice command component, an electronic programming guide interface component, and a media host device interface component. The voice command component is configured to convert a verbal message from the mobile voice device to text. The electronic programming guide interface component is configured to obtain a portion of an electronic programming guide when requested by the voice command component for verbal presentation thereof. The media host device interface component is configured to communicate a user selection associated with the responsive portion of the electronic programming guide to the media host device.

BRIEF DESCRIPTION OF THE SEVERAL VIEWS OF THE DRAWINGS

The present invention is described in detail below with reference to the attached drawing figures, which are incorporated by reference herein and wherein.

DETAILED DESCRIPTION

Figure 1:
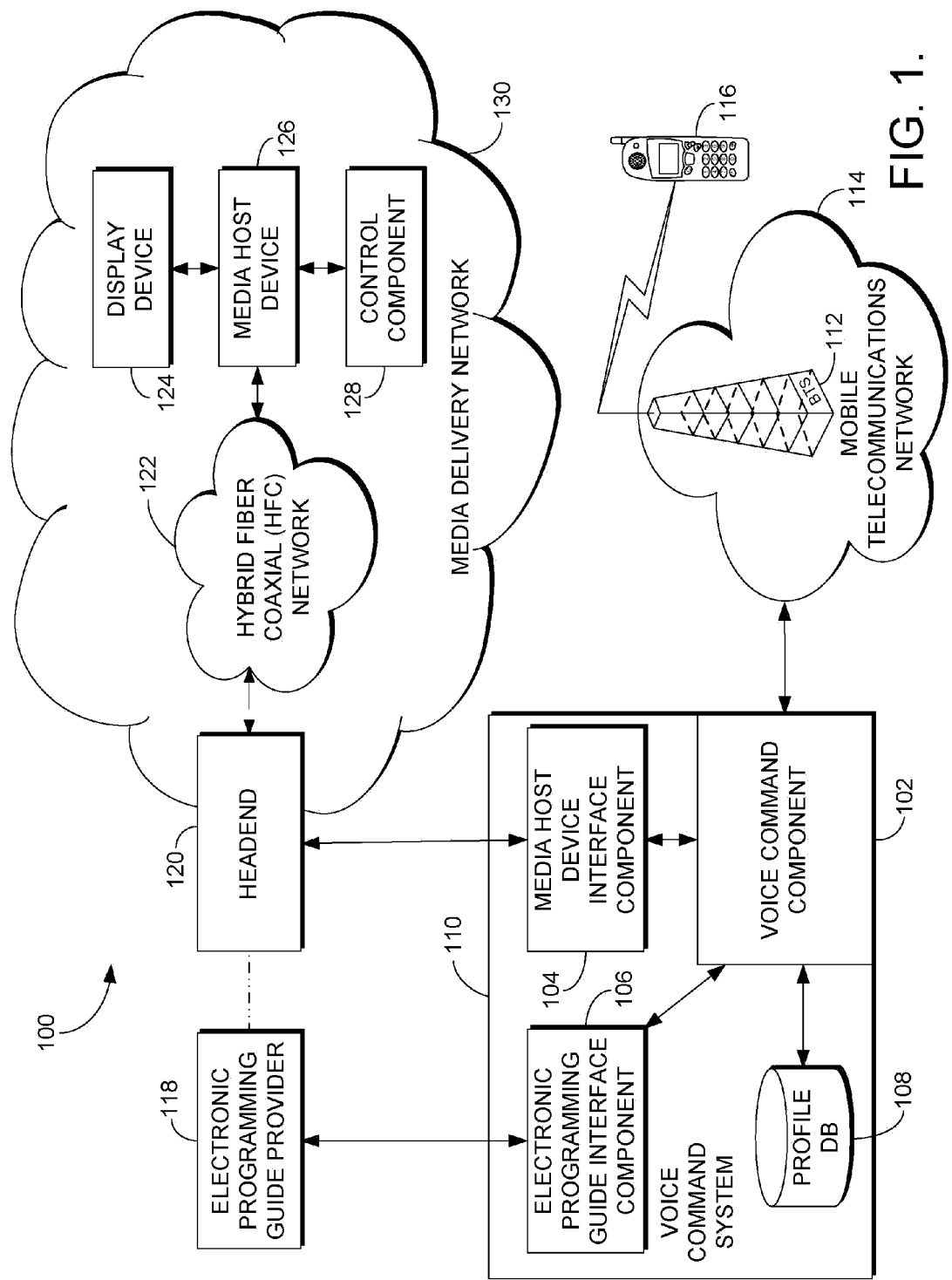
FIG. 1 is a block diagram of an exemplary system environment suitable for use in implementing the present invention.

The present invention permits a user to program a media host device such as a digital or personal video recorder from the user's mobile voice device by verbally receiving, navigating through, and selecting from an electronic programming guide. As a result, among other things, the current invention provides users with the ability to: (1) program a media host device from anywhere, thereby allowing full mobility; and (2) verbally control the media host device from the user's mobile voice device. Typically, modern mobile devices are designed to fit comfortably in a person's hand and pocket for ease of use and storage. The size of the devices, therefore, has shrunk over the years. The size of the display screen and input keyboard of the devices had to shrink accordingly. As a result, navigating through and selecting from an electronic programming guide displayed on such devices have become more difficult and time-consuming to perform. It is difficult to view letters displayed on a relatively small display screen. Moreover, an electronic programming guide typically carries large amounts of information, and thus navigating through such guide on a small display screen has become a time-consuming task. It is, furthermore, very difficult to use the relatively small input keyboard. Users are prone to press wrong buttons or type in wrong spellings, and the time for correcting such errors and/or misspellings can add up. Advantageously, the present invention circumvents such obstacles by providing users with the ability to program a media host device from their mobile voice devices through a voice-activated interface.

The invention also provides a uniform voice-activated interface platform for multiple electronic programming guides, multiple media-delivery networks (e.g., cable-television networks), and multiple communications networks (e.g., mobile telecommunication networks). By providing a uniform interface platform, for example, a user can access multiple electronic programming guides that are supported by the cable-television network to which the user subscribes. A cable-television network can serve its subscribers who, in turn, may subscribe to many different mobile telecommunication networks through the uniform interface platform and vice versa.

While the type of communications network described in detail herein is a telecommunications network, and more particularly a mobile telecommunications network, one skilled in the art will appreciate that the present invention may be implemented with other types of communications networks permitting the multidirectional exchange of information (in any format, including analogue). Likewise, one skilled in the art will appreciate that while a television network, and more particularly a cable-television network, is described herein as an example of a media-delivery network, the present invention may be implemented with other types of media-delivery networks.

Both the communications network and the media-delivery network may be protected, private networks wherein two entities must cooperatively integrate separate networks to provide the services. Components within the networks and communication pathways within and between the networks may also be protected. There is, however, no reason that the present invention could not be implemented in a wholly owned scenario wherein both the communications network and the media-delivery network belong to the same entity.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

A-Key Authentication Key
BTS Base Transceiver Station
DAVIC Digital Audio Video Council
DOCSIS Data Over Cable Service Interface Specification
DVR Digital Video Recorder
EPG Electronic Programming Guide
ESN Electronic Serial Number
HDR Hard Disk Recorder
HFC Hybrid Fiber Coaxial
IP Internet Protocol
MAC Media Access Control
MIN Mobile Identification Number
OCAP Open Cable Application Platform
PDA Personal Data Assistant
PDSN Packet Data Serving Node
PIN Personal Identification Number
PTR Personal TV Receiver
PVR Personal Video Recorder
PVS Personal Video Station
RADIUS Remote Authentication Dial In User Service
RF Radio Frequency
STB Set-Top Box
VPN Virtual Private Network
VoIP Voice Over Internet Protocol
VXML Voice Extensible Markup Language
XML Extensible Markup Language As one skilled in the art will appreciate, the present invention may be embodied as, among other things: a method, system, or computer-program product. Accordingly, the present invention may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

The subject matter of the present invention is described with specificity herein to meet statutory requirements. However, the description itself is not intended to limit the scope of this patent. Rather, the inventor has contemplated that the claimed subject matter might also be embodied in other ways, to include steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed.

Referring to FIG. 1, a block diagram is shown of an exemplary system environment 100 in which exemplary embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components and in any suitable combination and location. Various functions described herein as being performed by one or more entities may be carried out by hardware, firmware, and/or software. For instance, various functions may be carried out by a processor executing instructions stored in memory.

As shown in FIG. 1, system environment 100 may include, among other components, a voice command system 110, a mobile voice device 116, a base transceiver station (BTS) 112, a mobile telecommunication network 114, an electronic programming guide (EPG) provider 118, a media-delivery network 130, a headend 120, a hybrid fiber coaxial (HFC) network 122, a media host device 126, a control component 128, and a display device 124. The voice command system 110 is an exemplary embodiment of the present invention and includes a voice command component 102, a media host device interface component 104, an EPG interface component 106, and a profile database 108. As indicated previously, although a telecommunications network is described in detail herein, other types of communications networks may be employed within the scope of the invention. Likewise, although a cable-television network is described in detail herein, other types of media-delivery networks may be employed within the scope of the invention.

In general, the media host device 126 may be any device arranged to receive and display analog and/or digital television content and which is capable of communicating data to the media-delivery network 130. By way of example and not limitation, the media host device 126 may be a set-top box (STB), a legacy box, an STB having an integrated cable modem, a digital video recorder (DVR), a personal video recorder (PVR), a hard disk recorder (HDR), a personal video station (PVS), a personal TV receiver (PTR) and/or an integrated terminal device, physically integral to, for example, a television.

The display device 124 and the control component 128 may be communicatively connected to the media host device 126. The display device 124 may be any type of device capable of displaying television content and other data from the media host device 126. For example, the display device 124 may be a television or monitor. The control component 128 may be an infrared remote control device sensed by the media host device 126. Other devices, such as mobile telephones, keyboards, or PDAs could provide the same functionality. The connection between the control component 128 and the media host device 126 may be wireless, such as an infrared, radio, 802.11x, or Bluetooth connection, or directly by a cable or other physical connection such as a Universal Serial Bus (USB) connector.

Entities on the media-delivery network 130 are able to communicate with the media host device 126 via the headend 120. Television content and other data may be transmitted from the headend 120 to the media host device 126 using any suitable media, such as any combination of fiber-optic and coaxial cable, making up the HFC network 122. The HFC network 122 may contain a number of fiber nodes (not shown), which enable the transition between the fiber-optic and coaxial-cable portions of the network. Any number of fiber nodes may be used to convert from (i) fiber signals (carried by fiber-optic cable from the headend 120 to the fiber nodes) to (ii) RF signals (carried by coaxial cable from the fiber nodes to the media host device 126).

The headend 120 may be connected to multiple types of sources of television, media, and/or data content. The headend 120 may operate to amplify and modulate the video, audio, and data content onto a number of channels, so that the content of these sources may be received by devices, such as the media host device 126. The headend 120 may also operate to transmit and receive packet data to and from devices, such as the media host device 126, via the HFC network 122. The packet-data signaling between the headend 120 and the media host device 126 via the HFC network 122 may employ an "out-of-band" signaling channel and may comply with specifications, such as "DAVIC" (Digital Audio Video Council) specifications or "DOCSIS" (Data Over Cable Service Interface Specification) specifications. Communications, such as providing program guide information, performing software updates, fault monitoring, configuration, programming, accounting, and performance monitoring may be conducted on the out-of-band signaling channel. The out-of-band signaling channel may also be used by the media host device 126 to transmit information to the media-delivery network 130, such as registration and authentication messages, requests for program guide information, pay-per-view ordering messages, and a message confirming receipt and/or processing of an external command/request received through the headend 120.

The media host device 126 may have a MAC (Media Access Control) address, which will typically be assigned to the device by the manufacturer and will identify the media host device 126 as a unique physical device. In operation, each time the media host device 126 is powered on, it may transmit to the media-delivery network 130, via the out-of-band signaling channel, a registration/authentication message, which may contain the MAC address, as well as any other data uniquely identifying and authenticating the media host device 126 to the media-delivery network 130. The majority of cable providers use proprietary methods of registration and authentication specific to their particular headend implementation(s) and media host device manufacturer(s); however, some standards are evolving, such as OCAP (Open Cable Application Platform). Once the media host device 126 has registered and authenticated, the media-delivery network 130 may assign the media host device 126 a network address to use until the next time the media host device 126 is booted up. It is to this network address that any data bound for the media host device 126 may be transmitted.

The media-delivery network 130 may then associate the media host device's 126 MAC address or another identifier with the media host device's 126 assigned network address. Through this association, the customer's account then has a unique identifier associated with a unique network address on the media-delivery network 130. Typically, this network address will be an IP address, and the cable-television service provider will use IP routing to transmit cable-television content and other data to the media host device 126. However, proprietary addressing schemes, such as a VPN (Virtual Private Network) or a non-routable Private IP network created between the headend 120 and the media host device 126 each time the media host device 126 is powered on, may be used as well.

The mobile voice device 116 may be any type of device capable of wireless telecommunication. By way of example and not limitation, the mobile voice device 116 may be a cell phone or a personal data assistant (PDA) with voice capability. To provide wireless service to the mobile voice device 116, system environment 100 may include the BTS 112, which provides a wireless coverage area. The BTS 112 may communicate over a wireless air interface with one or more mobile devices, such as the mobile voice device 116, located in the wireless coverage area. The communication between the BTS 112 and the mobile voice device 116 may occur in a digital format, such as CDMA, TDMA, GSM, 3G, or 802.11x, or may occur in an analog format, such as AMPS.

To provide the mobile voice device 116 access to the mobile telecommunications network 114, the BTS 112 may be coupled with a base station controller (BSC) (not shown). The BTS 112 may include a packet control function, and a packet data serving node (PDSN) (not shown) may connect the BSC to the mobile telecommunications network 114. The PDSN may then act as a network access server, providing the mobile voice device 116 access to the mobile telecommunications network 114. Alternatively or additionally, system environment 100 may include other network elements for providing the mobile voice device 116 access to the mobile telecommunications network 114.

The mobile voice device 116 may be identified by employing any of a number of identifiers. By way of example and not limitation, the mobile voice device 116 may be identified using a unique Electronic Serial Number (ESN), which is typically hard-coded into the device; a unique Mobile Identification Number (MIN), which is typically assigned to the device by a telecommunications-service provider; a special authentication key (A-Key), which may be used for validating the identity of the mobile voice device 116; and/or a predetermined username and password. In addition, the mobile voice device 116 may be capable of engaging in VoIP communication and may be identified by a network address, such as an IP address. The network address may be permanently assigned to the mobile voice device 116 or may be dynamically assigned using a number of methods, such as a Simple IP process or a Mobile IP process.

In some embodiments of the present invention, such as that shown in FIG. 1, the voice command component 102 is configured to convert a verbal request or instruction from the mobile voice device 116 to text and convert text information to a voice message. Typically, the voice command component 102 receives a call from the mobile voice device 116. Generally, the mobile voice device 116 is provisioned prior to making the call such that it can be recognized by the voice command component 102. The voice command component 102 verbally prompts for a voice request or instruction from a caller at the mobile voice device 116 in response to the call. For example, the caller may inquire about a particular program if the caller is interested in the program. The caller may also make a request for verbal presentation of an EPG for navigation thereof.

In some embodiments, the voice command component 102 retrieves a profile associated with the mobile voice device 116 from the profile database 108 and identifies the address of the media host device 126 and one or more EPGs associated with the mobile voice device 116. In some embodiments, the voice command component 102 is also configured to communicate with the profile database 108 using RADIUS protocol.

In some embodiments, the voice command component 102 is configured to determine whether a caller's request or instruction would entail obtaining an EPG and, if so, to send a request to the EPG interface component 106 to obtain the EPG in response to the caller's request or instruction. Typically, the EPG interface component 106 is configured to obtain the EPG from an EPG provider 118 and to return the EPG to the voice command component 102. In some embodiments, the voice command component 102 is configured to communicate with the EPG interface component 106 using VXML protocol. In some other embodiments, the EPG interface component 106 is configured to cache at least one EPG and return the cached EPG when requested by the voice command component 102.

If the caller inquires about a specific program, the voice command component 102 typically searches the EPG to locate the program, presents information associated with the program (e.g., broadcasting time and/or date), and verbally prompts for the caller's confirmation. If, on the other hand, the caller generally requests the EPG, the voice command component 102 verbally presents the EPG so that the caller can navigate through the EPG and verbally select one or more programs that are of interest to the caller.

In some embodiments, the voice command component 102 is configured to generate a request in response to the caller's verbal selection and to pass the request to the media host device interface component 104. In some embodiments, the voice command component 102 is configured to communicate with the media host device interface component 104 through XML protocol. In some other embodiments, the media host device interface component 104 is configured to generate such request using the caller's selection that has been converted into text by the voice command component 102. Typically, the media host device interface component 104 transmits the request to the headend 120 associated with the media host device 126. In some embodiments, the headend 120 sends back a message confirming the receipt of such request. The media host device interface component 104 receives the confirmation message and relays it to the voice command component 102. The voice command component 102 receives the confirmation message and converts it to a voice message and delivers the voice message to the caller at the mobile voice device 116.

For example, suppose that Tom just found out that he may have to remain at work until late in the evening. Tom wants to program his DVR at home using his cellular phone to record a baseball game that will be broadcast later in the afternoon of the same day. He calls to reach a voice command service provider. Tom's call is received by the voice command component 102. Tom's cellular phone has been previously provisioned and thus the voice command component 102 recognizes his cellular phone and obtains a profile associated with the cellular phone from the profile database 108.

The voice command component 102 learns from the profile that Tom subscribes to TV Guide and Time-Warner cable service and prompts for further instructions from Tom. Tom says, "Record a baseball game playing at 5:30 this afternoon." Then the voice command component 102 sends a request to the EPG interface component 106 to obtain an EPG from TV Guide. The EPG interface component 106 obtains the latest EPG provided by TV Guide and delivers it to the voice command component 102. The voice command component 102 then verbally prompts for Tom's confirmation by asking Tom, "You have indicated that you wish to record the baseball game for New York Yankees vs. Boston Red Sox scheduled to broadcast at 5:30 this afternoon. Is this correct?" That game is indeed what Tom wants to record to watch when he gets home later in the evening. Tom verbally confirms it.

The voice command component 102 then generates a command encompassing Tom's request and sends the command to the media host device interface component 104, which, in turn, communicates the command to the headend 120. The headend 120 routes the command to the media host device 126. The media host device 126 receives the command, schedules a recording task based on the command, and sends through the headend 120 a message confirming receipt of the command back to the media host device interface component 104, which, in turn, relays the confirmatory message to the voice command component 102. The voice command component 102 then converts the confirmatory message into a voice message and presents the voice message to Tom. Tom ends the call, assured that the baseball game will be recorded. Come 5:30 p.m. of the same day, Tom's DVR begins recording the baseball game. Tom watches the recorded game later in the evening.

Figure 2:
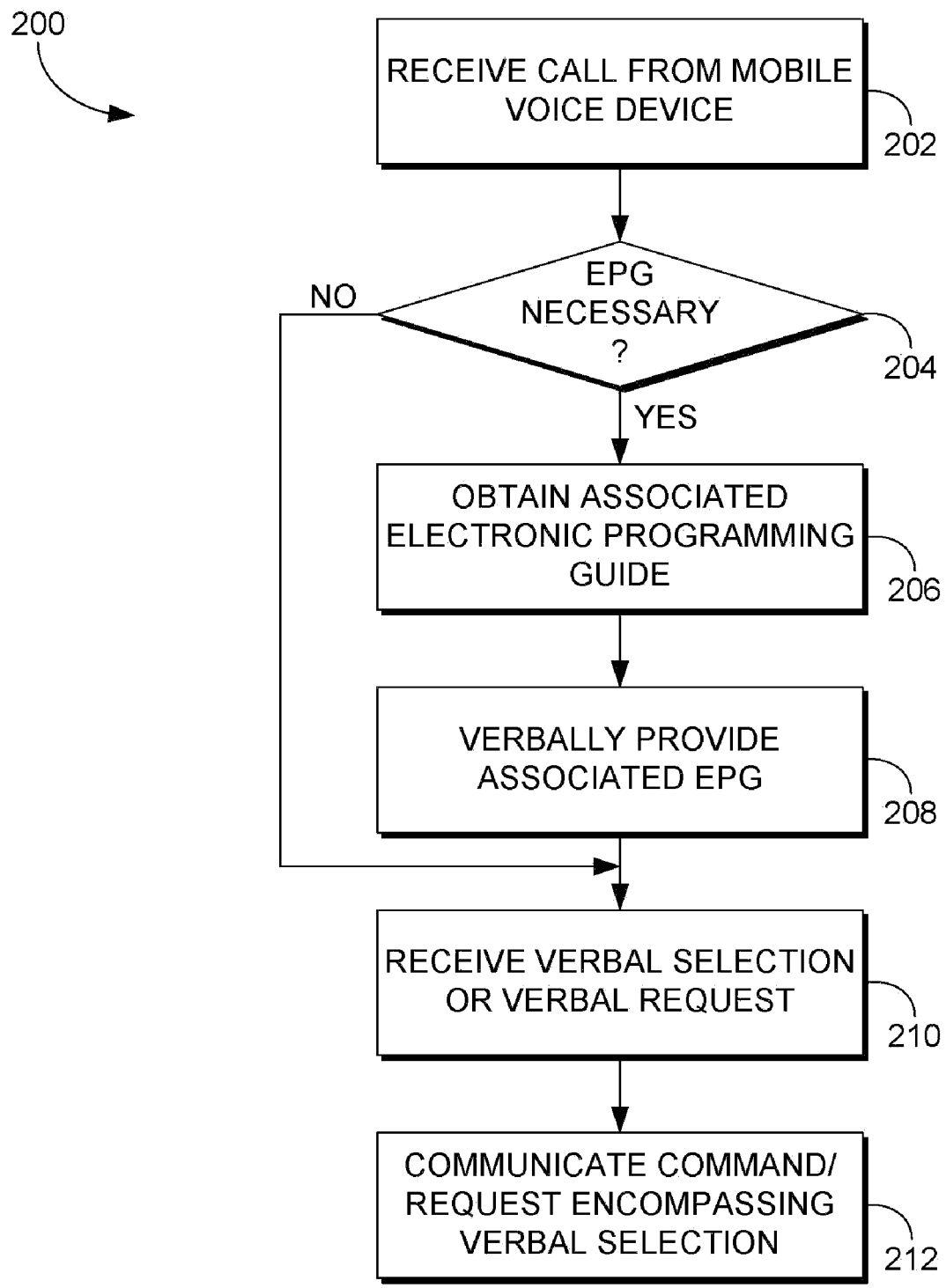
FIG. 2 is a flow diagram showing a method for controlling a media host device from a mobile voice device.

Turning to FIG. 2, a flow diagram is illustrated which shows a method 200 for controlling a media host device from a mobile voice device. Typically, the voice command component 102 receives a call to program the media host device 126 from the mobile voice device 116 at block 202. In response to the call, the voice command component 102 authenticates that the mobile voice device 116 is properly provisioned for voice command service. Typically, the mobile voice device 116 is provisioned before the call is made, and therefore the mobile voice device 116 can be recognized by the voice command component 102. If not, however, the voice command component 102 prompts for identification information. In some embodiments, the voice command component 102 prompts for a personal identification number (PIN).

Once the call is authenticated, the voice command component 102 prompts for a specific request from the caller. In some embodiments, for example, the voice command component 102 plays a recorded voice that says, "What can I do for you at this time?" The recorded voice can also say, "If you wish to record a program, say 'Record.' Or if you wish to cancel a scheduled recording, say 'Cancel.'" A caller makes a specific request.

In response to such specific request, typically, the voice command component 102 determines whether an EPG needs be obtained in order to serve the request at block 204. For instance, if the caller makes a request to record a program, such request typically entails having to obtain an EPG. The voice command component 102 obtains an EPG that is associated with the mobile voice device 116 or the caller at block 206. In some embodiments, the voice command component 102 retrieves a profile associated with the mobile voice device 116 from the profile database 108 and identifies the EPG provider 118 and the address of the headend 120 associated with the mobile voice device 116. The voice command component 102 then sends a request containing the identity of the EPG provider 118 to the EPG interface component 106. The EPG interface component 106 obtains the EPG from the EPG provider 118 and returns the EPG to the voice command component 102.

If the caller's request can be honored without having to obtain an EPG (e.g., the caller wishes to cancel a previously scheduled recording), then the voice command component 102 prompts for further input necessary to perform the caller's request from the caller at block 210. In some embodiments, for example, a profile associated with the mobile voice device 116 or the caller keeps track of the caller's selections and requests. The voice command component 102, in concert with the profile database 108, can obtain the profile, identify a list of recording tasks currently scheduled for the caller, verbally present the list to the caller, and ask which of the tasks the caller wishes to cancel.

Once the voice command component obtains an EPG at block 206, the voice command component 102 verbally presents the EPG to the caller at the mobile voice device 116 at block 208. For example, the voice command component 102 may play, "For the remaining time of today, the history channel will show the following programs. From 3:00 pm until 4:30 pm, a documentary about battles during World War II in the Pacific Theater will be on the channel. If you wish to record this program, say, 'World War II.'" In block 210, the voice command component 102 receives a verbal selection associated with the EPG from the mobile voice device 116. For example, the caller in the history channel example can select the documentary program by saying, "World War II."

In block 212, the voice command component 102 converts the verbal selection made by the caller into text. In some embodiments, the voice command component 102 generates a request or a command that encompasses the caller's selection. The voice command component 102 then sends the command to the media host device interface component 104, which, in turn, communicates the command to the headend 120 associated with the media host device 126. In some embodiments, the media host device 126 sends a confirmation message back to the media host device interface component 104 through the headend 120. The voice command component 102 receives and converts the confirmation message into a voice message and presents the voice confirmation message to the caller at the mobile voice device 116. Communication between the media host device interface component 104 and the media host device 126 may be provided in accordance with the disclosure of U.S. application Ser. No. 11/088,615, which is herein incorporated by reference in its entirety.

Figure 3:
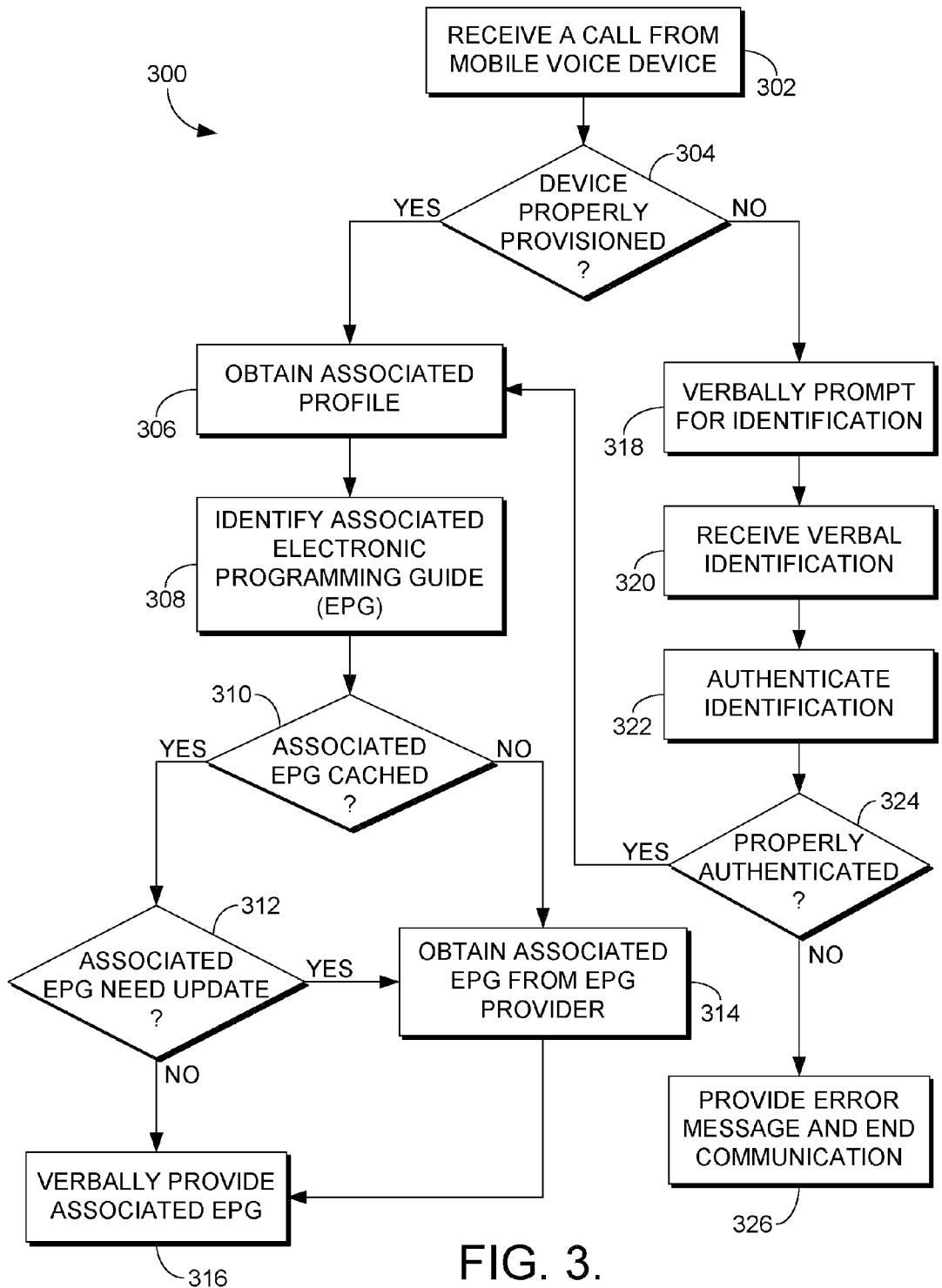
FIG. 3 is a flow diagram showing a method for obtaining a portion of an electronic programming guide in response to a call that is made to program a media host device from a mobile voice device.

FIG. 3 is a flow diagram showing an exemplary method 300 for obtaining a portion of an electronic programming guide in response to a call that is made to program a media host device from a mobile voice device. A call is received from the mobile voice device 116 at block 302. In some embodiments, a call is received at the voice command component 102 from the mobile voice device 116. At block 304, it is determined whether the mobile voice device 116 is properly provisioned prior to making the call.

If it is determined at block 304 that the mobile voice device 116 has not been provisioned properly prior to making the call, the caller at the mobile voice device 116 is verbally prompted to provide further input that can be used to identify the caller at block 318. Typically, the voice command component 102 plays a recorded voice prompting the caller for a PIN or other equivalent information such as a user name and a password.

At block 320, such authenticating information is verbally communicated. Typically, the voice command component 102 receives the information that the caller verbally provided. At block 322, the caller is authenticated using the information. In some embodiments, the voice command component 102 performs authentication tasks in concert with the profile database 108. At block 324, it is determined whether the caller is properly authenticated. In some embodiments, the voice command component 102 sends an inquiry containing the authenticating information to the profile database 108 to learn whether the profile database 108 has a record that matches the authenticating information.

If it is determined at block 324 that the caller is properly authenticated, a profile associated with the caller is obtained at block 306 to proceed further to honor the caller's request. If, however, it is determined that the caller failed to provide correct authenticating information, an error message would be provided and the call will be terminated at block 326. In some embodiments, the caller will be given more than one opportunity to provide the authenticating information. In other embodiments, the unsuccessful call is recorded and reported.

If, on the other hand, it is determined at block 304 that the mobile voice device 116 is properly provisioned, a profile that is associated with the mobile voice device 116 is retrieved. Typically, the voice command component 102 recognizes the mobile voice device 116 if the mobile voice device has been provisioned. In some embodiments, the voice command component 102 retrieves the profile from the profile database 108 using RADIUS protocol.

Once the profile is retrieved, an EPG associated with the mobile voice device 116 is identified from the profile at block 308. In some embodiments, there may be more than one EPG that is registered in connection with the mobile voice device 116. If more than one EPG is identified from the profile, the voice command component 102 verbally prompts for further input from the caller at the mobile voice device 116 to determine which EPG to obtain.

At block 310, it is further determined whether the EPG that is identified from the profile at block 308 is already cached. In some embodiments, the EPG interface component 106 caches one or more EPGs for faster access thereto when the EPGs are requested. Typically, the voice command component 102 sends a request containing the identity or address of the EPGs to the EPG interface component 106.

If it is determined that the EPGs are already cached, it is further determined whether the cached EPGs need an update at block 312. In some embodiments, EPGs that have been cached have a timer that can indicate whether to obtain new versions thereof. If it is determined that the cached EPGs need not be updated, the voice command component 102 verbally provides the cached EPGs to the mobile voice device 116 at block 316. If, however, it is determined that the EPGs are not already cached at block 310 or it is determined that the cached EPGs need to be updated at block 312, then the EPGs are obtained from the EPG provider 118 at block 314. Typically, the EPG interface component 106 communicates with the EPG provider 118 and obtains the EPGs. Once the EPGs are obtained from the EPG provider 118, the voice command component 102 verbally provides the cached EPGs to the mobile voice device 116 at block 316.

Figure 4:
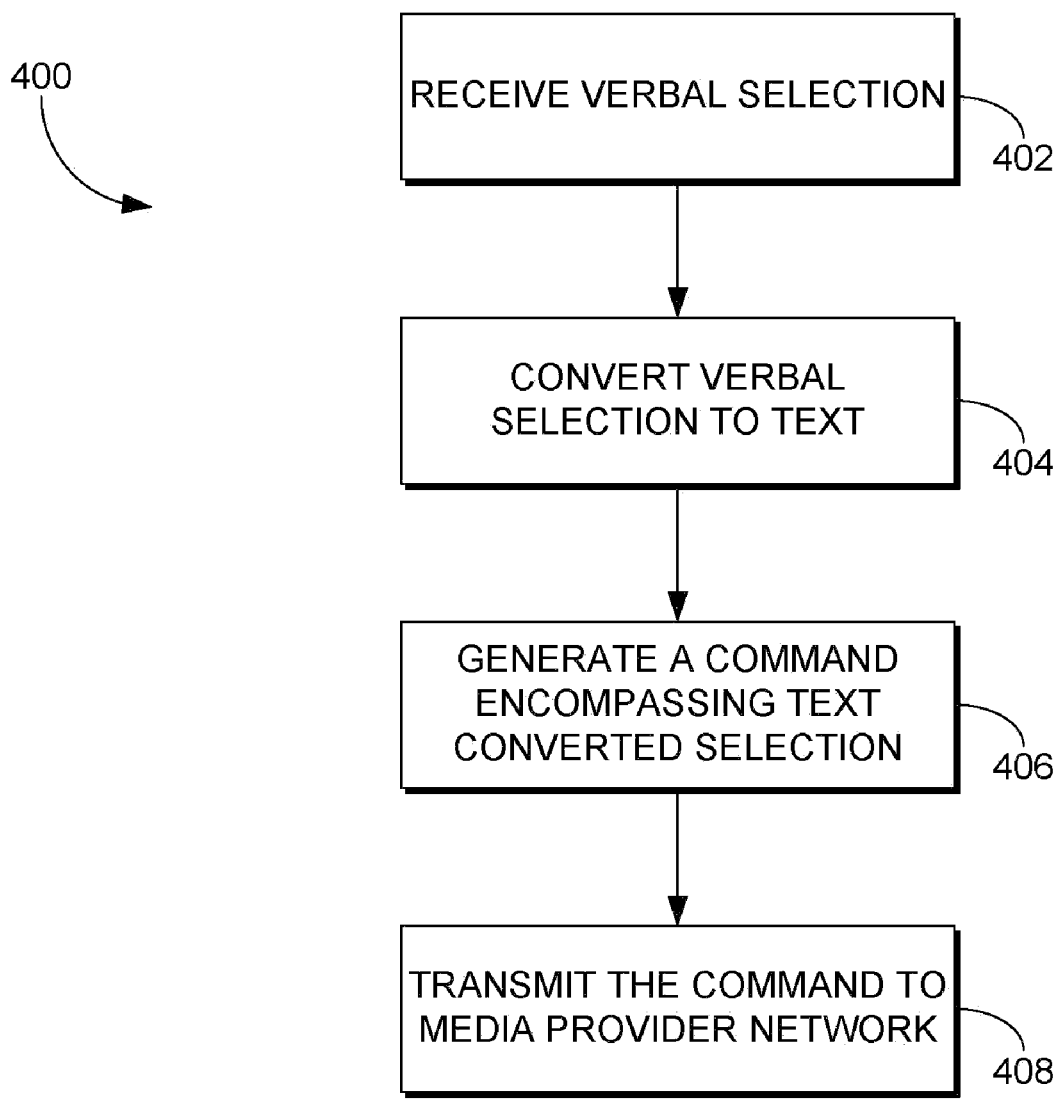
FIG. 4 is a flow diagram showing a method for communicating a command encompassing a verbal selection made from a mobile voice device to a media host device.

FIG. 4 is a flow diagram showing an exemplary method 400 for communicating a command encompassing a verbal selection made from a mobile voice device to a media host device. A verbal selection associated with an EPG is received from the mobile voice device 116 at block 402. Next, at block 404, the verbal selection is converted to text. Typically, such verbal selection is received at the voice command component 102, which converts the verbal selection to text.

At block 406, a command or a request that encompasses the converted verbal selection is generated. In some embodiments, the voice command component 102 generates such command or request and passes it to the media host device interface component 104. In some other embodiments, the voice command component 102 passes the converted verbal selection to the media host device interface component 104, which, in turn, generates a command or a request using the passed selection.

At block 408, the command or request generated at block 406 is communicated to the headend 120. Typically, the media host device interface component 104 establishes communication with the headend 120 and transmits the command or request to the headend 120. In some embodiments, the headend 120 sends a message confirming receipt of the command/request back to the media host device interface component 104, which, in turn, communicates the confirmatory message to the voice command component 102 for verbal presentation thereof to the mobile voice device 116. In some other embodiments, a message confirming that the command/request is received and processed from the media host device 126 is received at the media host device interface component 104 through the HFC network 122 and the headend 120.

As can be seen, the present invention and its equivalents are well-adapted to provide a new and useful method for providing the ability to: (1) program a media host device from anywhere, thereby allowing full mobility; and (2) verbally control the media host device from the user's mobile voice device. The present invention and its equivalents are also well-adapted to provide a new and useful method for providing a uniform voice-activated interface platform for multiple electronic programming guides, multiple media-delivery networks (e.g., cable-television networks), and multiple communication networks. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for controlling a media host device from a mobile voice device, the method comprising:
   receiving a call from the mobile voice device;
   determining that a version of the electronic programming guide is stored in cache on the mobile voice device;
   determining that the version of the electronic programming guide stored in the cache of the mobile device is outdated;
   receiving an updated version of the electronic programming guide;
   storing, in the cache, the updated version of the electronic programming guide;
   using the electronic programming guide to verbally communicate, through the mobile voice device, one or more titles of one or more television programs being broadcast on a cable station;
   using the electronic programming guide to verbally communicate, through the mobile voice device, when the one or more television programs are to be broadcast on the cable station;
   receiving a verbal selection associated with the electronic programming guide from the mobile voice device;
   communicating a command encompassing the verbal selection to the media host device.

2. The method of claim 1, further comprising retrieving a profile associated with the mobile voice device.

3. The method of claim 2, wherein the identified electronic programming guide is obtained if the profile supports access thereto.

4. The method of claim 1, further comprising verbally providing an initial prompt to receive a verbal request.

5. The method of claim 1, further comprising verbally providing a confirmation of receiving the command from the media host device.

6. The method of claim 1, further comprising generating the command.

7. The method of claim 1, further comprising authenticating the call.

8. The method of claim 1, wherein the media host device comprises a digital video recorder.

9. The method of claim 1, wherein the mobile voice device comprises a mobile phone.

10. One or more computer-storage medium having computer-executable instructions for performing the method recited in claim 1.

11. A system for controlling a media host device from a mobile voice device, the system comprising:
    a voice command component configured to;
    (1) convert a verbal message from the mobile voice device to text, wherein the text indicates a request for recording a television show,
    (2) pass the text to a headend, and
    (3) receive a confirmatory message that a recording task was scheduled for the television show;

an electronic programming guide interface component configured to obtain a portion of an electronic programming guide when requested by the voice command component for verbal presentation thereof, wherein the electronic programming guide comprises information specifying a plurality of titles of television programs and a plurality of times when the television programs will be broadcast across a plurality of cable stations, and wherein the electronic programming guide interface component determines whether a version of the electronic programming guide has previously been stored in a cache of the mobile device, and if so, determines that the version of the electronic programming guide needs to be updated; and a media host device interface component configured to communicate a user selection, from the mobile voice device, associated with the responsive portion of the electronic programming guide to the media host device.

12. The system of claim 11, wherein the voice command component is further configured to verbally provide the responsive portion of the electronic programming guide to the mobile voice device.

13. The system of claim 11, wherein the voice command component is further configured to verbally provide an initial prompt to receive a verbal request from the mobile voice device.

14. The system of claim 11, wherein the voice command component is further configured to generate a command encompassing the user selection.

15. The system of claim 14, wherein the media host device interface component is further configured to communicate the command to the media host device.

16. The system of claim 11, further comprising at least one profile database configured to store profile information associated with the mobile voice device.

17. The system of claim 16, wherein the voice command component uses the profile information to determine whether the electronic programming guide interface component may obtain the electronic programming guide.

18. The system of claim 11, wherein the voice command component is further configured to verbally provide a confirmation of having received the user selection received from the media host device.

19. The system of claim 11, wherein the electronic programming guide interface component is further configured to cache at least one electronic programming guide.

20. A method for controlling a media host device from a mobile phone, the method comprising:

receiving a call from the mobile phone;

determining that the mobile phone is provisioned for voice command service;

based on how the mobile phone being properly provisioned, determining a cable-television network to which a user subscribes;

determining a profile associated with the mobile phone;

using the profile to identify an electronic programming guide offered to the user by the cable-television network;

obtaining a portion of the electronic programming guide;

using the electronic programming guide to verbally communicate, through the mobile phone, one or more titles of one or more television programs being broadcast on a cable station;

using the electronic programming guide to verbally communicate, through the mobile phone, when the one or more television programs are to be broadcast on the cable station;

receiving a verbal selection from the mobile phone, the verbal selection indicating a request to record a television program;

communicating a command encompassing the verbal selection to the media host device;

receiving, on the mobile phone, a confirmatory message confirming a recording task was initiated;

converting, on the mobile phone, the confirmatory message into a voice message; and presenting the voice message on the mobile phone.

* * * * *